United States Patent [19]
Bennett

[11] Patent Number: 5,928,544
[45] Date of Patent: Jul. 27, 1999

[54] COOKING APPLIANCE WITH MOVABLE BASE UNIT HAVING TWO HEATING ELEMENTS PROVIDING HEAT FROM ABOVE OR BELOW THE FOOD TO BE COOKED

[75] Inventor: Peter Bennett, Brickendon, United Kingdom

[73] Assignee: The Range Cooker Company PLC,, Lancashire, United Kingdom

[21] Appl. No.: 09/017,844

[22] Filed: Feb. 3, 1998

[51] Int. Cl.[6] .............................. A47J 37/04; H05B 1/00
[52] U.S. Cl. ...................... 219/478; 219/480; 219/454; 219/385; 219/472; 126/39 J; 99/340; 99/390; 392/418
[58] Field of Search .............................. 392/418; 219/454, 219/444, 521, 385, 472, 474, 475, 478, 480; 126/25 A, 25 AA, 39 J, 92 AC; 99/340, 422, 390, 393, 396, 449; 34/91

[56] References Cited

U.S. PATENT DOCUMENTS

| | | | |
|---|---|---|---|
| 1,171,258 | 2/1916 | Schneider | 219/472 |
| 1,568,767 | 1/1926 | Proulx | 219/454 |
| 2,430,582 | 11/1947 | Reich | 219/454 |
| 2,631,216 | 3/1953 | Ames | 219/454 |
| 2,681,404 | 6/1954 | Hofer | 219/521 |
| 3,316,389 | 4/1967 | Markowitz | 219/454 |
| 3,401,256 | 9/1968 | Siegla | 219/454 |
| 3,610,885 | 10/1971 | Zingg | 219/461 |
| 5,000,083 | 3/1991 | Pickave | 99/327 |
| 5,094,221 | 3/1992 | Ho | 126/92 AC |

FOREIGN PATENT DOCUMENTS

| | | | |
|---|---|---|---|
| 878092 | 1/1943 | France | 219/454 |
| 1176334 | 8/1964 | Germany | 219/454 |
| 2516906 | 10/1976 | Germany | 99/340 |
| 2702901 | 7/1978 | Germany | 219/474 |
| 170147 | 1/1960 | Sweden | 219/454 |
| 351569 | 6/1931 | United Kingdom | 219/454 |

*Primary Examiner*—John A. Jeffery
*Attorney, Agent, or Firm*—Koppel & Jacobs

[57] ABSTRACT

A cooking appliance having a hob surface is provided with a hob heating element provided in the top surface of a base unit. The base unit is arranged to be capable of being raised above the level of the hob surface in order to expose a further heating element provided in the bottom surface of the base unit whereby to permit food to be cooked with heat from above or below. The heating elements may be of gas or electrical.

11 Claims, 3 Drawing Sheets

COOKING APPLIANCE WITH MOVABLE BASE UNIT HAVING TWO HEATING ELEMENTS PROVIDING HEAT FROM ABOVE OR BELOW THE FOOD TO BE COOKED

BACKGROUND OF THE INVENTION

The present invention provides apparatus for heating and/or cooking food which is easily accessible above the level of a kitchen work surface, and which does not interfere with the work surface or ventilation units when not in use.

Heating or cooking food using radiation and downward convection from a heat source generated above the food has been used for many years. This technique is known variously as grilling and broiling; it is hereinafter referred to as grilling, and the heating or cooking device used therefor is hereinafter referred to as a grill. Both gas and electric powered grills are well known.

Despite the advantages of grilling, such as being healthier and more controllable than frying, grilling has the disadvantage that the actual heating means has to be above the level of the food being cooked.

In many appliances this is achieved by providing a support which extends vertically from the back of the appliance from which the grill protrudes. This would normally overhang above hobs provided for frying and boiling. Grills of this type have the principle disadvantages of being unsightly and obstructing any ventilation fan which might be installed above the appliance.

In other types of appliance, the grill is located at the top of an oven cavity, below the level of the work surface. Slots are provided for a grill pan. This technique has several disadvantages. Firstly, it is difficult to see the progress of the cooking food due to the grill pan being close to waist height. Secondly, the grill often needs to be closed to protect controls which are generally located just above and in front of the grill. Thirdly, the oven cavity is prevented from being used for baking, as the two cooking techniques would generally adversely affect one another. This generally leads to the use of a small oven cavity for grilling sometimes with the option of using the cavity for baking instead. This accordingly limits the available space for a large baking oven cavity.

SUMMARY OF THE PRESENT INVENTION

An object of the present invention is to provide an appliance which does not look unsightly, yet which provides all the advantages of cooking with a "raised grill".

According to the present invention there is provided means for heating or cooking food from above, said means being arranged to be movable from one height to a different height.

If the cooking apparatus is in combination with an oven, the oven cavity is substantially unaffected by the position of the cooking means.

BRIEF DESCRIPTION OF THE DRAWINGS

Specific embodiments of the present invention will now be described with reference to the accompanying drawings in which.

DESCRIPTION OF THE PREFERRED EMBODIMENT

Figure 1A:
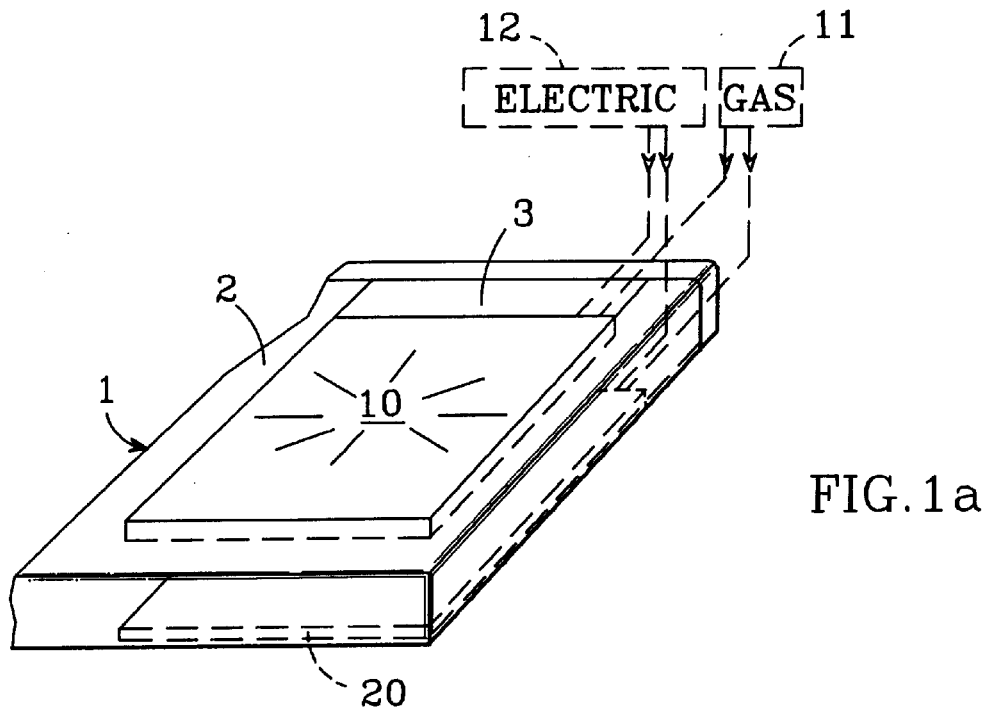
FIG. 1a shows a perspective view of a first embodiment of the present invention in a first mode of operation.

According to a first embodiment of the present invention there is provided a cooking appliance 1 which is provided with a hob surface 2. The hob surface is provided with one or more hob heating elements 10 which may be gas powered 11 or electrically powered 12, at least one of which is supported by a hob base unit 5. The hob base unit 5 is attached at its rear to a support member 3 which extends downward from the edge connected to the hob base unit 5. This support member is provided with means arranged to allow movement of the support member over a range of positions in a vertical direction. This could be a spring arranged to provide sufficient force to move the support member upwards to an upper position. A small downward manual force would offset the resultant upward force allowing a user to push the hob base units back down to a lower position. Suitable means are provided for releasably locking the hob base unit in the upper and lower positions.

The hob base unit 5 supports at least one grill element 20, which again may be gas powered or electrically powered, and which faces downwards.

When the support member 3 is engaged in its lower position, as shown in FIG. 1a, the hob base unit fits into an appropriately shaped recess 7 in the top surface of the appliance to give the appearance of a normal hob. Any hobs on the hob base unit are accordingly at a standard vertical height at which they are easily accessible. In this position, a switching mechanism 28, which includes a switch 30 (shown in FIGS. 2a, 2b and 3), ensures that the grill element 20 cannot operate.

Figure 3:
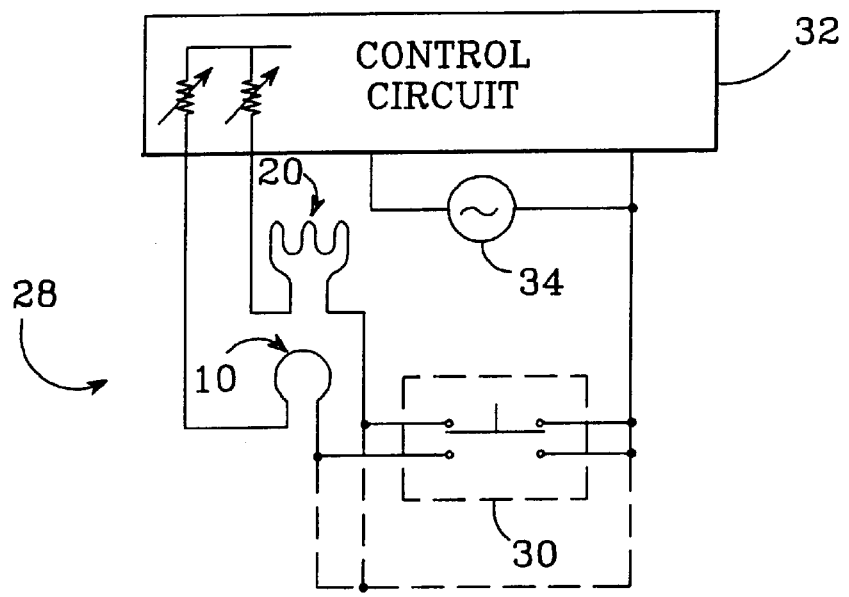
FIG. 3 is a schematic diagram of a switching mechanism that enables the use of one or the other of the invention's heating elements.
Figure 1B:
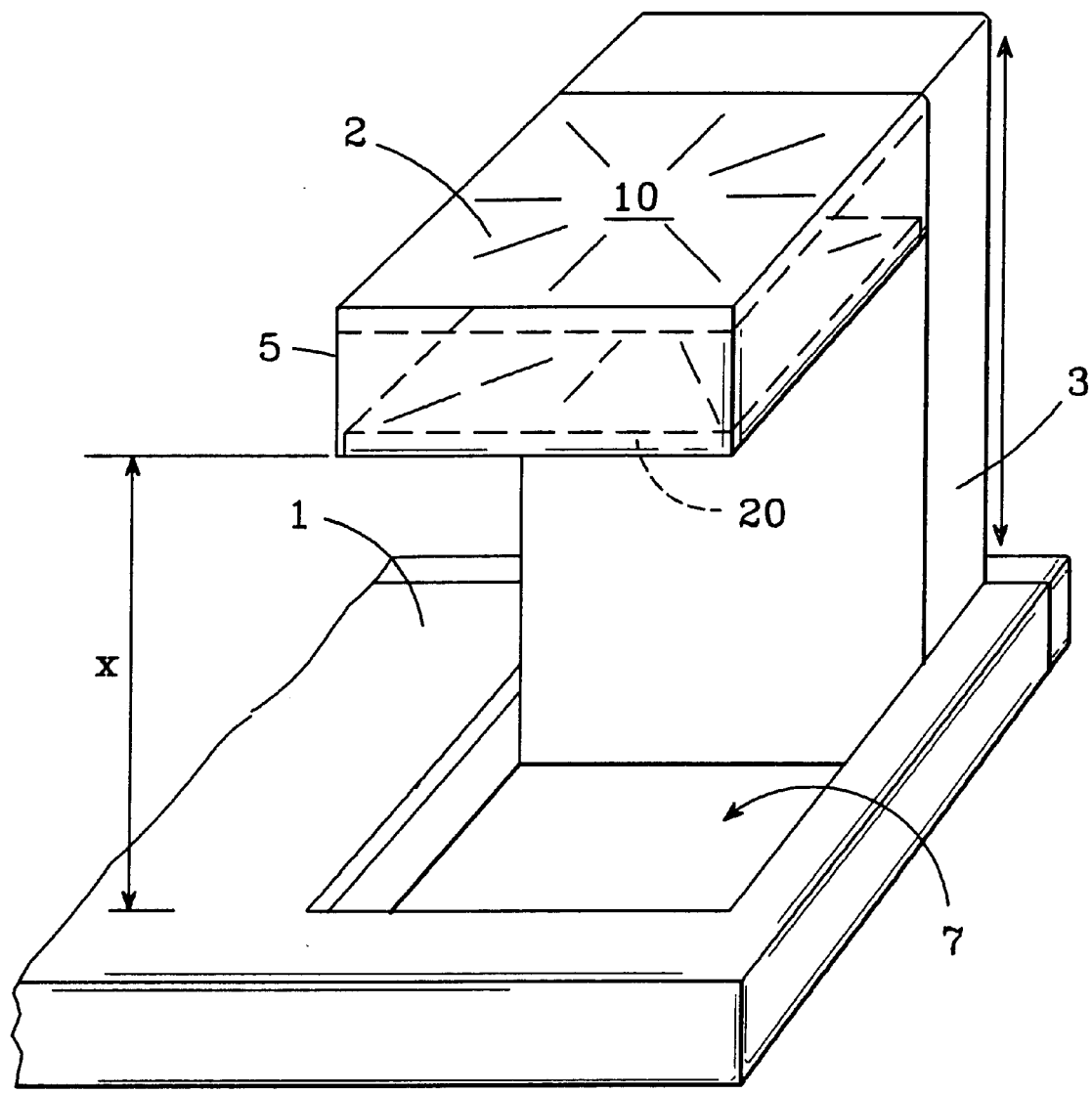
FIG. 1b shows a perspective view of a first embodiment of the present invention in a second mode of operation.
Figure 2A:
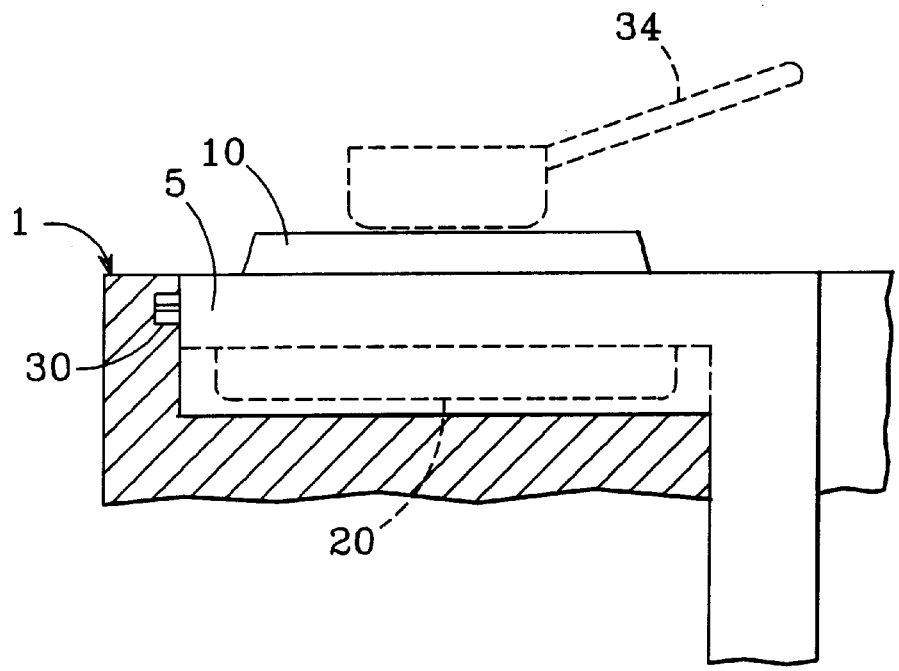
FIG. 2a shows a cutaway side view of the first embodiment in the first mode of operation.
Figure 2B:
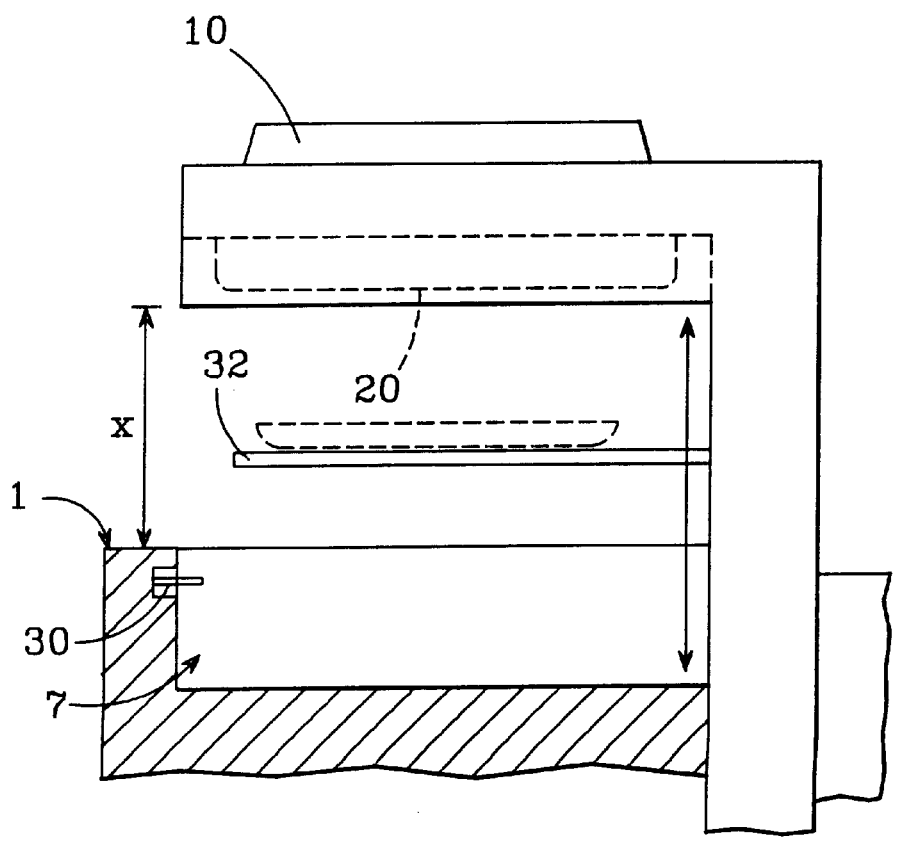
FIG. 2b shows a cutaway side view of the first embodiment in the second mode of operation.

When the support member 3 is engaged in its upper position, as shown in FIG 1b and FIG. 2b, the hob base unit is raised with the support member out of the recess 7 to provide a vertical gap x between the bottom of the grill element and the top surface of the oven. This distance x is sufficient to allow a grill pan or other suitable utensil 32 to be inserted into appropriately located slots mounted on the underside of the hob base unit or the support member 3, in order to use the grill to cook items of food. In this position the switching mechanism ensures that the hob cannot operate. A schematic diagram of switching mechanism 28 is shown in FIG. 3. A control circuit 32 provides independently controllable power to heating elements 10 and 20. In a preferred embodiment, switch 30 is connected between the heating elements and control circuit 32, allowing current to flow through only one of the heating elements at a time. When switch 30 is in its extended position, only heating element 20 is powered; when depressed, only heating element 10 is powered. In an alternate embodiment (discussed below), switch 34 is bypassed (indicated with a dashed line) and heating elements 10 and 20 are allowed to be operated concurrently.

Thus, when the hob base unit is in its lower position, as shown in FIGS. 1a and 2a, no grill is evident and the cooker has a substantially flat surface with hobs resting thereon or enclosed therein. A cooking utensil 34 is positioned on heating element 10, as it might be used when the hob base unit is in its lowered position.

When the hob base unit is in its upper position, an easily accessible grill is provided which can be used for cooking items of food while also using other hobs.

Embodiments are also envisaged in which the support member is not moved by a spring arrangement, but movement is instead controlled by a motor 34 as depicted in FIG. 3.

Embodiments are envisaged in which the support member is not limited to move in a vertical direction, but also forward or backward or even over a curved path whereby the hob 10 no longer remains in a horizontal orientation. Forward or backward motion might be a suitable way to lock the support member into its upper or lower position.

In a modification of all the above embodiments, the hob heating elements 10 are not prevented from operating when in the raised position, so that the hob and grill means can be used concurrently.

Embodiments are also envisaged wherein no hob 2 or hob heating element 10 is present, but instead simply comprise a grill element 20 supported by a grill support means 5 which is movable between two positions. In the first position, the top surface of the grill support sits flush with a work top, and hence does not look unsightly. When in the second position, the grill support means 5 is raised above the level of the work surface allowing the grill element to cook or heat food. This embodiment is essentially a pop-up grill.

The appliance 1 could be a stand alone hob or part of a normal cooker with oven.

I claim:

1. An apparatus arranged to heat or cook food, comprising:

a first generally planar member having opposed first and second major surfaces, said first member being movable between a lowered and a raised position;

a first heating element arranged to heat food from below provided on the first surface of the first member; and a second heating element independent of said first heating element arranged to heat food from above provided on the second surface of the first member when said first member is in said raised position;

said movable first member and said first and second heating elements enabling food to be heated from above or below solely by raising or lowering said first member as necessary.

2. The apparatus of claim 1, further arranged to prevent the operation of said second heating element when said first member is in said lowered position.

3. The apparatus of claim 1, further arranged to prevent the operation of said first heating element when said first member is in said raised position.

4. The apparatus of claim 1, wherein said first heating element comprises an electric hob.

5. The apparatus of claim 1, wherein said first heating element comprises a gas fueled hob.

6. The apparatus of claim 1, wherein said second heating element comprises an electric heating element arranged to radiate heat downwards.

7. The apparatus of claim 1, wherein said second heating element comprises gas fueled heating means arranged to radiate heat downwards.

8. The apparatus of claim 1, wherein said first member is arranged to be received in a recess in a work surface when in said lowered position whereby said second heating element is inaccessible.

9. The apparatus of claim 1, wherein said first heating element and said second heating element are of different constructions, said different constructions enabling said first element and said second element to provide heat with different characteristics and to thereby provide different types of cooking.

10. The apparatus of claim 1, wherein said first member is mounted on a support member having at least one slot arranged to support a cooking utensil inserted into it when said first member is in said raised position.

11. An apparatus arranged to heat or cook food, comprising:

a first generally planar member having opposed first and second major surfaces, said first member being movable between a lowered and a raised position;

a first heating element arranged to heat food from below provided on the first surface of the first member; and a second heating element independent of said first heating element arranged to heat food from above provided on the second surface of the first member when said first member is in said raised position;

said first element and said second element being independently controllable such that food can be concurrently heated from above and below when said first member is in said raised position.

\* \* \* \* \*